US005524924A

United States Patent [19]
Steffens, Jr. et al.

[11] Patent Number: 5,524,924
[45] Date of Patent: Jun. 11, 1996

[54] METHOD AND APPARATUS FOR RESTRAINING AN OCCUPANT OF A VEHICLE UPON A SIDE IMPACT AGAINST THE VEHICLE

[75] Inventors: Charles E. Steffens, Jr., Washington; Louis R. Brown, Oxford, both of Mich.

[73] Assignee: TRW Vehicle Safety Systems Inc., Lyndhurst, Ohio

[21] Appl. No.: 153,074

[22] Filed: Nov. 15, 1993

[51] Int. Cl.[6] .......................... B60R 21/22; B60R 21/28
[52] U.S. Cl. .......................... 280/730.2; 280/739
[58] Field of Search .......................... 280/728 R, 728 B, 280/730 A, 734, 735, 729, 743 R, 743 A, 739

[56] References Cited

U.S. PATENT DOCUMENTS

| | | |
|---|---|---|
| 3,582,107 | 6/1971 | Goetz . |
| 3,642,303 | 2/1972 | Irish et al. .......................... 280/730 R |
| 3,731,949 | 5/1973 | Radke . |
| 3,733,091 | 5/1973 | Fleck et al. . |
| 3,802,719 | 4/1974 | Brown .......................... 280/739 |
| 4,946,191 | 8/1990 | Putsch . |
| 4,966,388 | 10/1990 | Warner et al. .......................... 280/730 A |
| 5,172,790 | 12/1992 | Ishikawa et al. . |
| 5,333,899 | 8/1994 | Witte .......................... 280/730 A |
| 5,340,151 | 8/1994 | Sato .......................... 280/730 A |

FOREIGN PATENT DOCUMENTS

| | | |
|---|---|---|
| 0590845 | 4/1994 | European Pat. Off. . |
| 4307175 | 9/1993 | Germany .......................... 280/730 A |
| 2-249740 | 10/1990 | Japan .......................... 280/730 A |
| 9006247 | 6/1990 | WIPO . |

*Primary Examiner*—Karin L. Tyson
*Attorney, Agent, or Firm*—Tarolli, Sundheim & Covell

[57] ABSTRACT

A vehicle occupant shoulder restraint (51) is located on a vehicle door (16) and is inflatable from a stored condition on the door to an inflated condition between the door and the shoulder area of an occupant. When inflated, the occupant shoulder restraint (51) engages the shoulder of the occupant. A vehicle occupant upper rib restraint (52, 53) is located on the vehicle door (16) and is inflatable from a stored condition on the door to an inflated condition between the door and the upper rib area of the occupant. When inflated, the shoulder restraint (51) extends further into the vehicle passenger compartment than the upper rib restraint (52, 53). When inflated, the occupant rib restraint (52, 53) engages upper the rib area of the occupant. A vehicle occupant head restraint (210) is located on the vehicle door (16) and is inflatable from a stored condition on the door to an inflated condition between the door and the head of the occupant. When inflated, the occupant head restraint (210) engages the head of the occupant. The occupant head restraint (210) is inflated into position to restrain the head of the occupant after the occupant shoulder restraint (51) has been inflated and has restrained the shoulder of the occupant.

16 Claims, 6 Drawing Sheets

METHOD AND APPARATUS FOR RESTRAINING AN OCCUPANT OF A VEHICLE UPON A SIDE IMPACT AGAINST THE VEHICLE

TECHNICAL FIELD

The present invention relates to a method and apparatus for protecting an occupant of a vehicle upon a collision or the like, and is particularly directed to a method and apparatus for restraining an occupant of a vehicle upon a side impact against the vehicle.

BACKGROUND ART

A vehicle occupant restraint for protecting an occupant of a vehicle upon a side impact against the vehicle is known. Typically, such a vehicle occupant restraint includes an inflatable air bag and a source of inflation fluid for inflating the air bag, both of which are mounted on a vehicle door. When a side impact against the vehicle occurs, the source of inflation fluid provides inflation fluid to inflate the air bag. The inflated air bag restrains movement of the occupant and prevents the occupant from violently striking parts of the vehicle during a side impact against the vehicle.

SUMMARY OF THE INVENTION

In accordance with one aspect of the present invention, a vehicle occupant shoulder restraint means is located on a vehicle side, such as on the vehicle door, and is inflatable from a stored condition to an inflated condition between the vehicle side and the shoulder area of an occupant of the vehicle. When inflated, the vehicle occupant shoulder restraint means engages the shoulder of the occupant. A vehicle occupant upper rib restraint means separate from the shoulder restraint means is also located on the vehicle side and is inflatable from a stored condition to an inflated condition between the vehicle side and the upper rib area of the occupant. When inflated, the vehicle occupant upper rib restraint means engages the upper rib area of the occupant.

Sensor means is provided for sensing a side impact against the vehicle. Means is provided for directing inflation fluid into the vehicle occupant shoulder restraint means and the vehicle occupant upper rib restraint means when a side impact against the vehicle is sensed by the sensor means.

The occupant shoulder restraint means has an innermost occupant contact point in the passenger compartment which lies in a first vertical plane extending in the forward and rearward directions of travel of the vehicle when the occupant shoulder restraint means is inflated. The occupant upper rib restraint means has an innermost occupant contact point in the passenger compartment which lies in a second vertical plane extending in the forward and rearward directions of travel of the vehicle when the occupant upper rib restraint means is inflated. The first and second vertical planes lie parallel with a central vertical plane which extends in the forward and rearward directions of travel of the vehicle and divides the vehicle in half in the forward and rearward directions of travel of the vehicle. The first vertical plane lies closer in distance to the central vertical plane than the second vertical plane. Thus, the innermost occupant contact point of the occupant shoulder restraint means is closer to the occupant than the innermost occupant contact point of the occupant upper rib restraint means when the occupant shoulder restraint means and the occupant upper rib restraint means are inflated.

Since the innermost occupant contact point of the occupant shoulder restraint means is closer to the occupant than the innermost occupant contact point of the occupant upper rib restraint means, as the occupant shoulder restraint means and the occupant upper rib restraint means are inflating, the probability of the shoulder of the occupant engaging the occupant shoulder restraint means before the upper rib area of the occupant engages the occupant upper rib restraint means is higher than otherwise. Thus, the shoulder of the occupant is more likely to be restrained by the inflating occupant shoulder restraint means before the upper rib area of the occupant is restrained by the inflating occupant upper rib restraint means.

It is known that the shoulder structure of a human can withstand higher loads and deflections than the upper rib area of a human. Also, it is known that the upper rib area can withstand higher loads and deflections than the lowest rib area (abdominal ribs) of a human. It is also known that the lowest rib area is more prone to injury than the upper rib area which, in turn, is more prone to injury than the shoulder structure of a human.

By restraining the shoulder of the occupant before restraining the upper rib area of the occupant in accordance with the present invention, the probability of injury to the upper rib area of the occupant is minimized. Moreover, the lowest rib area of the occupant is not significantly loaded by the present invention. Thus, in accordance with the present invention, there is a high potential for applying a larger amount of restraint to the shoulder of the occupant than to the upper rib area of the occupant and a low potential for injury to the rib area of the occupant.

In accordance with another aspect of the present invention, the apparatus comprises vehicle occupant restraint means inflatable from a stored condition to an inflated condition between the vehicle side and the side of an occupant of the vehicle. The vehicle occupant restraint means includes an inflatable first portion for, when inflated, engaging the torso of the occupant and an inflatable second portion for, when inflated, engaging the head of the occupant. Sensor means is provided for sensing a side impact against the vehicle. Means is provided for directing inflation fluid into the first portion to inflate the first portion when a side impact against the vehicle is sensed by the sensor means. Means is provided for inflating the second portion into position to engage the head of the occupant after the first portion has been inflated and has engaged the torso of the occupant. Thus, the time at which the head of the occupant is engaged by the second portion is delayed relative to the time at which the torso of the occupant is engaged by the first portion.

An advantage results from restraining the head of an occupant by an occupant restraint means later than when the torso of the occupant is restrained. Specifically, during a side impact against the vehicle, the torso may move out from under the head, causing the head to rotate toward the side of the vehicle which was impacted. By delaying the time at which the head of the occupant is engaged and restrained by the second portion of the vehicle occupant restraint means relative to the time at which the torso of the occupant is engaged by the first portion of the vehicle occupant restraint means, the occupant is optimally protected against injury to the head as well as the torso.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
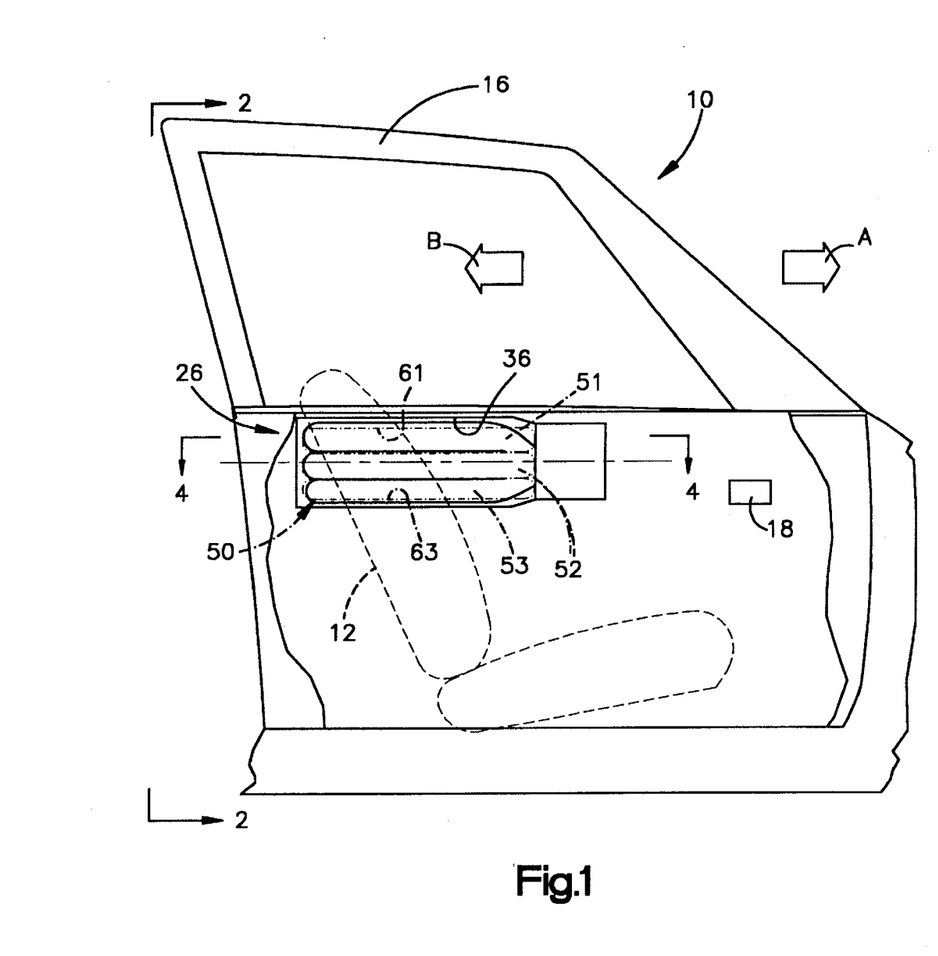
FIG. 1 is a schematic illustration of a vehicle embodying an inflatable vehicle occupant restraint system constructed in accordance with the present invention.

The present invention is directed to an inflatable vehicle occupant restraint apparatus to restrain movement of an occupant of a vehicle upon a side impact against the vehicle. The specific construction of the occupant restraint apparatus may vary. By way of example, an inflatable vehicle occupant restraint apparatus 10 is illustrated in FIG. 1. The vehicle occupant restraint apparatus 10 is in a vehicle which has a forward direction of travel indicated by an arrow A and a rearward direction of travel indicated by an arrow B.

Figure 2:
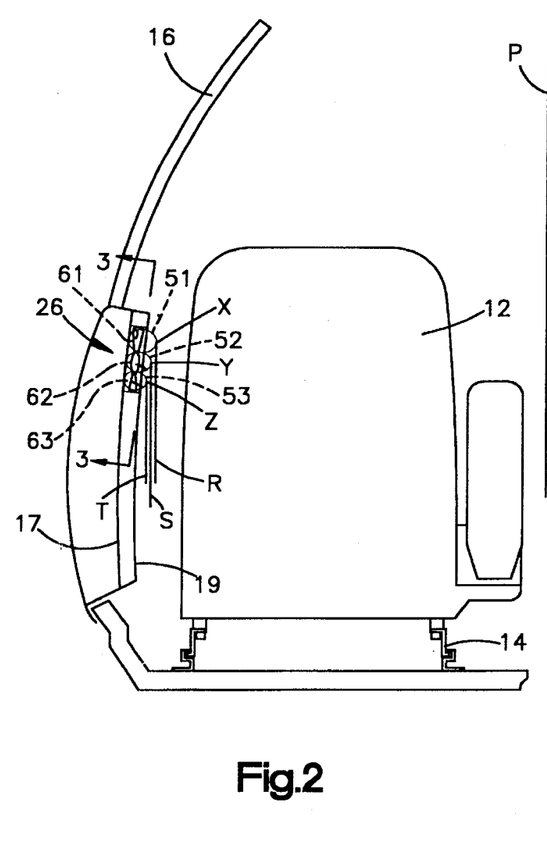
FIG. 2 is a schematic view in the direction of line 2—2 of FIG. 1.

Referring to FIGS. 1 and 2, the vehicle includes a vehicle seat 12 located in the passenger compartment of the vehicle and mounted on a seat track 14. A vehicle door 16 is located on the side of the vehicle beside the seat 12. The door 16 allows for ingress of an occupant to the passenger compartment and egress of an occupant from the passenger compartment.

An impact sensor 18 of any suitable known construction is mounted on the door 16, for example, or any other portion of the vehicle. When a side impact of at least a predetermined magnitude against the vehicle occurs, the impact sensor 18 provides a signal indicative of the impact.

An air bag assembly 26 is mounted to an inner door panel 17 of the vehicle door 16. The air bag assembly 26 includes an inflatable air bag 50 which, when inflated, protects an occupant in the seat 12. As shown in FIGS. 1-4, the air bag 50 is disposed in an air bag compartment 36 in the side of the vehicle, and in particular, in the vehicle door 16, when the air bag 50 is in a stored condition (illustrated in solid lines in FIGS. 1 and 4). The air bag 50 is inflatable from its stored condition to an inflated condition ( best illustrated in dashed lines in FIG. 2A). A cover panel 34 (FIG. 4) is attached to an interior compartment panel 19 on the vehicle door 16 and covers the air bag 50 from view when the air bag 50 is in its stored condition.

The air bag assembly 26 also includes a diffuser 32 (FIG. 4) made of a flat plate 29 and a dished plate 31 connected to the flat plate 29. The dished plate 31 has an annular projection 33 to which a neck area 35 of the air bag 50 is sealingly engaged. The flat plate 29 and the dished plate 31 define a generally rectangular chamber 43 which communicates through an opening 45 in the projection 33 to the interior of the air bag 50. The flat plate 29 and the dished plate 31 define an annular flange 39 which is fixed to the inner door panel 17 of the vehicle door 16 to fix the diffuser 32 to the inner door panel 17 of the vehicle door 16.

The air bag assembly 26 further includes an actuatable inflator 30 which actuates in response to receiving an ignition signal from the impact sensor 18 indicative of the occurrence of a side impact against the vehicle 10. A side impact against the vehicle occurs when the vehicle experiences a substantial force or force component acting transverse to the forward and rearward directions of travel of the vehicle.

The inflator 30 contains a source of inflation fluid, preferably inert gas, such as a pyrotechnic gas generating material or a quantity of stored gas or a combination of stored gas and gas generating material. When actuated, the inflator 30 directs gas to the chamber 43 of the diffuser 32. The gas is directed from chamber 43 through the opening 45 into the interior of the air bag 50 to inflate the air bag 50. The inflator 30 is oriented so that the flow of gas from the inflator 30 is directed along the door 16 and causes the air bag 50 to inflate along the door 16 in the rearward direction of travel of the vehicle. The air bag compartment 36 is confined so that the air bag 50 also breaks away the cover panel 34 and expands into the passenger compartment of the vehicle 10 as the air bag 50 inflates.

When the air bag 50 expands to its inflated condition, it restrains movement of an occupant in the seat 12 and prevents the occupant from violently striking parts of the door 16. The air bag 50 then quickly collapses so that the occupant is free to exit from the vehicle. To permit the air bag 50 to collapse, the air bag 50 may be formed of a porous material and/or may have vents which enable the gas to flow out of the air bag 50 or may have some other structure to permit it to collapse.

Figure 2A:
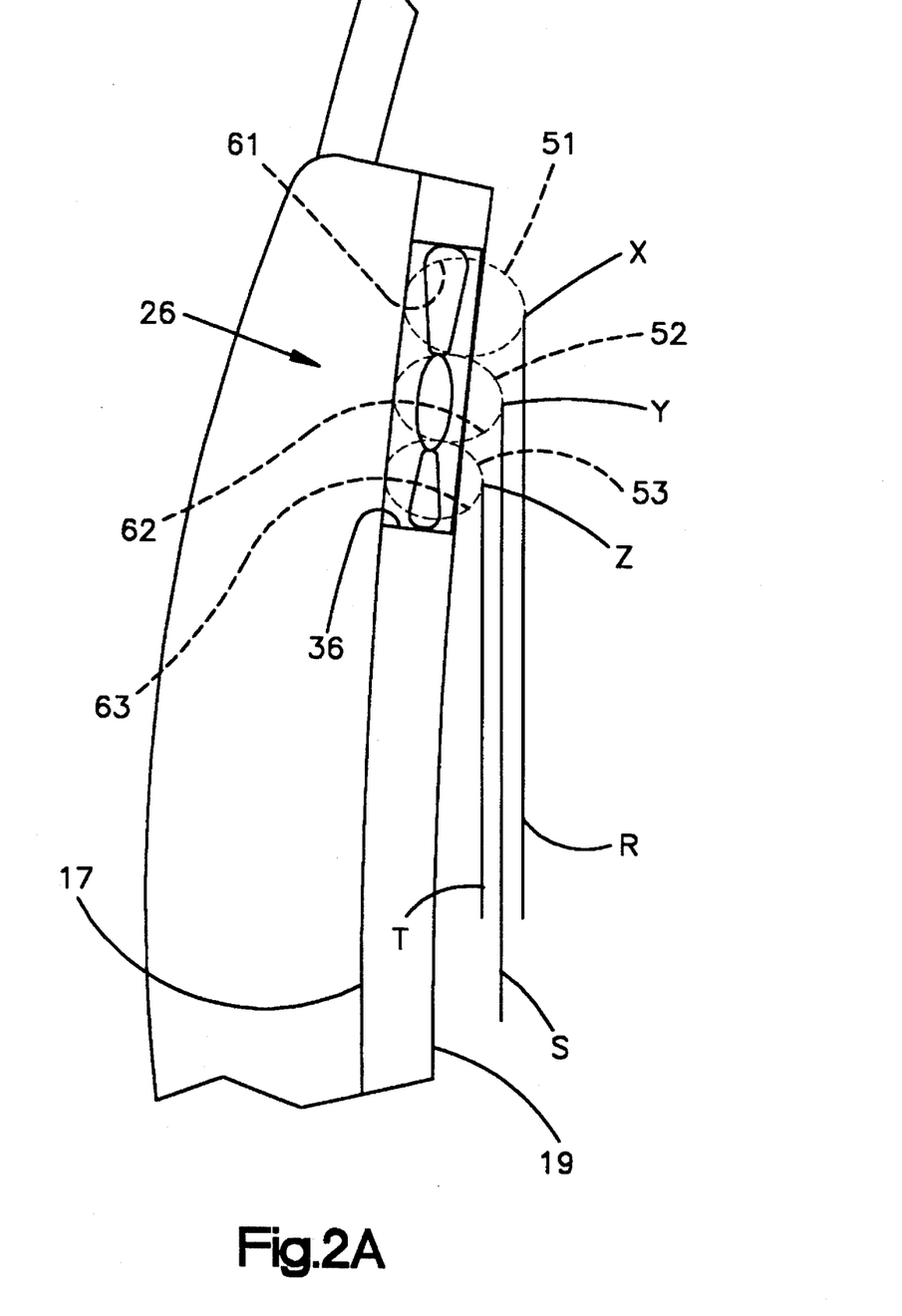
FIG. 2A is an enlarged view of portion of FIG. 2.
Figure 3:
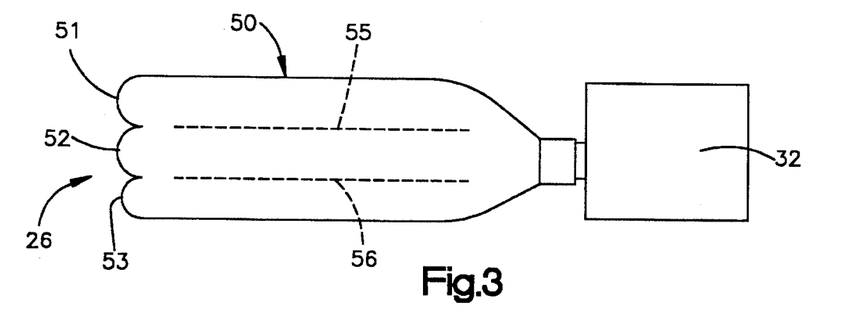
FIG. 3 is an enlarged view of a portion of FIG. 2, as viewed in the direction of line 3—3 of FIG. 2.
Figure 4:
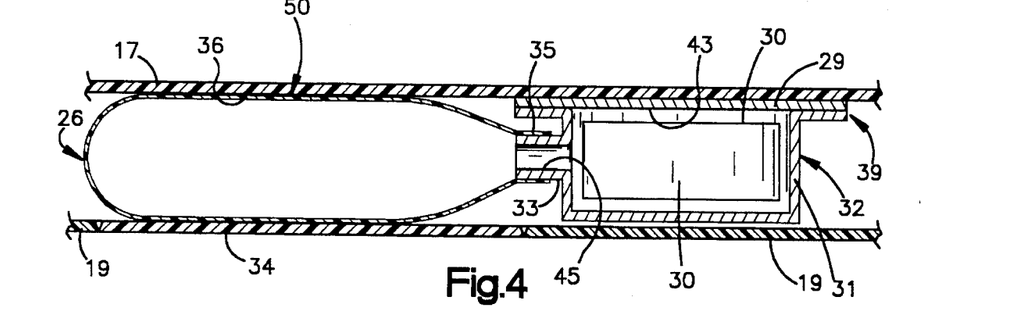
FIG. 4 is an enlarged sectional view of a portion of FIG. 1, as viewed in the direction of line 4—4 of FIG. 1.

In accordance with the present invention, the air bag 50 comprises three inflatable air bag portions 51, 52, 53 which are shown in their inflated conditions in dashed lines in FIG. 2A. The air bag portions 51, 52, 53 are shown in their deflated conditions in solid lines in FIGS. 1-4. Each of the air bag portions 51, 52, 53 is tubular in shape and has its longitudinal central axis extending along the forward and rearward directions of travel of the vehicle. The air bag portions 51, 52, 53 define chambers 61, 62, 63, respectively. The three chambers 61, 62, 63 converge and communicate in the vicinity of the neck area 35 of the air bag 50. The chambers 61, 62, 63 may be formed, for example, by sewing stitches at locations 55 and 56 on the air bag 50, as best shown in FIG. 3. Stitches at location 55 are sewn in the material of the air bag 50 to define in part the air bag portion 51 and the air bag portion 52. Stitches at location 56 are sewn in the material of the air bag 50 to define in part the air bag portion 52 and the air bag portion 53. The stitches 55, 56 terminate short of the end of the air bag 50 spaced from the diffuser 32. Thus, the three chambers 61, 62, 63 communicate at the end of the air bag spaced from the diffuser.

The air bag 50 may be constructed in a number of different ways. For example, a panel may be sewn into the air bag at the location of each of the stitches 55, 56. Such panels would give the air bag more extent into the passenger compartment.

Each of the air bag portions 51, 52, 53 is inflatable from a stored condition on the vehicle door 16 to an inflated condition between the door 16 and the occupant of the vehicle. More specifically, the air bag portion 51 is inflatable from a stored condition on the door 16 to an inflated condition between the door 16 and the shoulder area of the occupant. When inflated, the air bag portion 51 engages the shoulder area of the occupant. The inflated air bag portion 51 is located adjacent the shoulder area of the occupant to engage the shoulder area of the occupant to resist movement of the shoulder area of the occupant toward the door 16 when the occupant engages the inflated air bag portion 51.

The air bag portion 52 is inflatable from a stored condition on the vehicle door 16 to an inflated condition between the door 16 and the upper rib area of the occupant. When inflated, the air bag portion 52 engages the upper rib area of the occupant. The inflated air bag portion 52 is located adjacent the upper rib area of the occupant to engage the upper rib area of the occupant to resist movement of the upper rib area of the occupant toward the door 16 when the occupant engages the inflated air bag portion 52.

The air bag portion 53 is inflatable from a stored condition on the vehicle door 16 to an inflated condition between the door 16 and a rib area of the occupant lower than the rib area engaged by air bag portion 52. When inflated, the inflated air bag portion 53 engages the lower rib area of the occupant above the abdominal ribs so that the abdominal ribs are not significantly loaded. The inflated air bag portion 53 is located adjacent the lower rib area of the occupant to engage the lower rib area of the occupant to resist movement of the lower rib area of the occupant when the occupant engages the inflated air bag portion 53.

Referring to FIG. 2, the inflated air bag portion 51 has an innermost occupant contact point X in the passenger compartment. The contact point X lies in a first vertical plane R which extends in the forward and rearward directions of travel of the vehicle. The inflated air bag portion 52 has an innermost occupant contact point Y in the passenger compartment which lies in a second vertical plane S extending in the forward and rearward directions of travel of the vehicle. Similarly, the inflated air bag portion 53 has an innermost occupant contact point Z in the passenger compartment which lies in a third vertical plane T extending in the forward and rearward directions of travel of the vehicle.

A central vertical plane P extends in the forward and rearward directions of travel of the vehicle and divides the vehicle in half in the forward and rearward directions of travel of the vehicle. The first, second, and third vertical planes R, S, T lie parallel with the central vertical plane P. The first vertical plane R lies closer in distance to the central vertical plane P than the second vertical plane S. The second vertical plane S lies closer in distance to the central vertical plane P than the third vertical plane T. Thus, the innermost occupant contact point X lies closer to the central vertical plane P than the innermost occupant contact point Y which, in turn, lies closer in distance to the central vertical plane P than the innermost occupant contact point Z.

Since contact point X is closer to the central vertical plane P than contact points Y, Z, as the air bag portions 51, 52, 53 are inflating, the probability of the shoulder of the occupant engaging contact point X before the rib area of the occupant engages contact points Y, Z is higher than otherwise. It is known that the shoulder structure of a human can withstand higher loads and deflections than the upper rib area of a human. Also, the upper rib area can withstand higher loads than the lowest rib area of a human. Thus, the lowest rib area (abdominal ribs) is not significantly loaded by the illustrated system. Since the shoulder of the occupant potentially engages air bag 50 first and is able to withstand more force than the upper and lower rib areas of the occupant, the air bag 50 restrains the vehicle occupant and has the advantage of minimizing the possibility of injury to the rib area of the occupant.

When the air bag 50 is inflated, the pressure in the chambers 61, 62, 63 tends to equalize. However, instantaneously, the pressure in one region of the air bag 50 may differ from the pressure in another region of the air bag 50. For example, at a given instant, the pressure in the chamber 61 could be higher than the pressure in the chambers 62, 63. Thus, the air bag portion 51 could be restraining the occupant to a greater extent than the air bag portions 52, 53.

Figure 5:
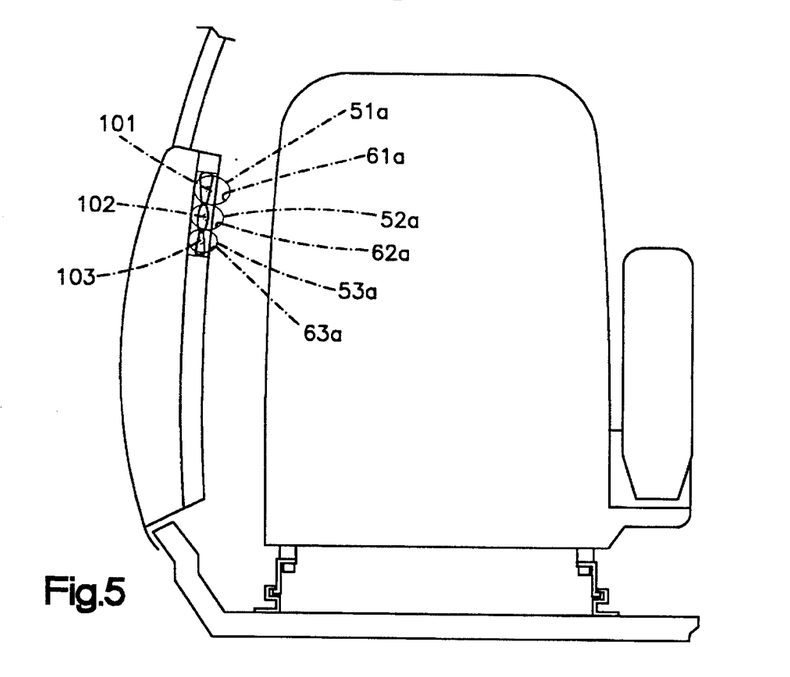
FIG. 5 is a view, similar to FIG. 2, showing a second embodiment of the present invention.

A second embodiment of the present invention is illustrated in FIG. 5. Since the embodiment of the invention illustrated in FIG. 5 is generally similar to the embodiment illustrated in FIGS. 1–4, similar numerals are utilized to designate similar components, the suffix letter "a" being associated with the numerals of the embodiment of FIG. 5 to avoid confusion.

As shown in FIG. 5, a vent valve 101 is associated with the air bag portion 51a. A vent valve 102 is associated with the air bag portion 52a. Similarly, a vent valve 103 is associated with the air bag portion 53a. The vent valve 101 opens when the pressure in the chamber 61a of the air bag portion 51a reaches a first predetermined pressure. The vent valve 102 opens when the pressure in the chamber 62a of the air bag portion 52a reaches a second predetermined pressure which is less than the first predetermined pressure. The vent valve 103 opens when the pressure in the chamber 63a of the air bag portion 53a reaches a third predetermined pressure which is less than the first predetermined pressure in chamber 61a and further is less than the second predetermined pressure in chamber 62a.

When a vent valve opens, inflation fluid is released from the respective chamber to control the pressure in that chamber. Since the chamber 61a of the air bag portion 51a is vented at a pressure which is greater than the pressure at which the chamber 62a of the air bag portion 52a is vented and the pressure at which the chamber 63a of the air bag portion 53a is vented, the air bag chamber 61a has a relatively higher pressure than air bag chambers 62a, 63a and, thus, the air bag portion 51a may restrain the shoulder of the occupant with a relatively high force. Each of the air bag chambers 62a, 63a has a relatively lower pressure than the air bag chamber 61a and, thus, the air bag portions 52a, 53a may restrain the rib areas of the occupant they contact with relatively lower forces. Alternatively, different pressures can be provided in the air bag chambers 61a, 62a, and 63a by providing each air bag portion with a vent, with each vent being of a different area. Thus, inflation fluid may flow from each air bag portion at different flow rates.

Figure 6:
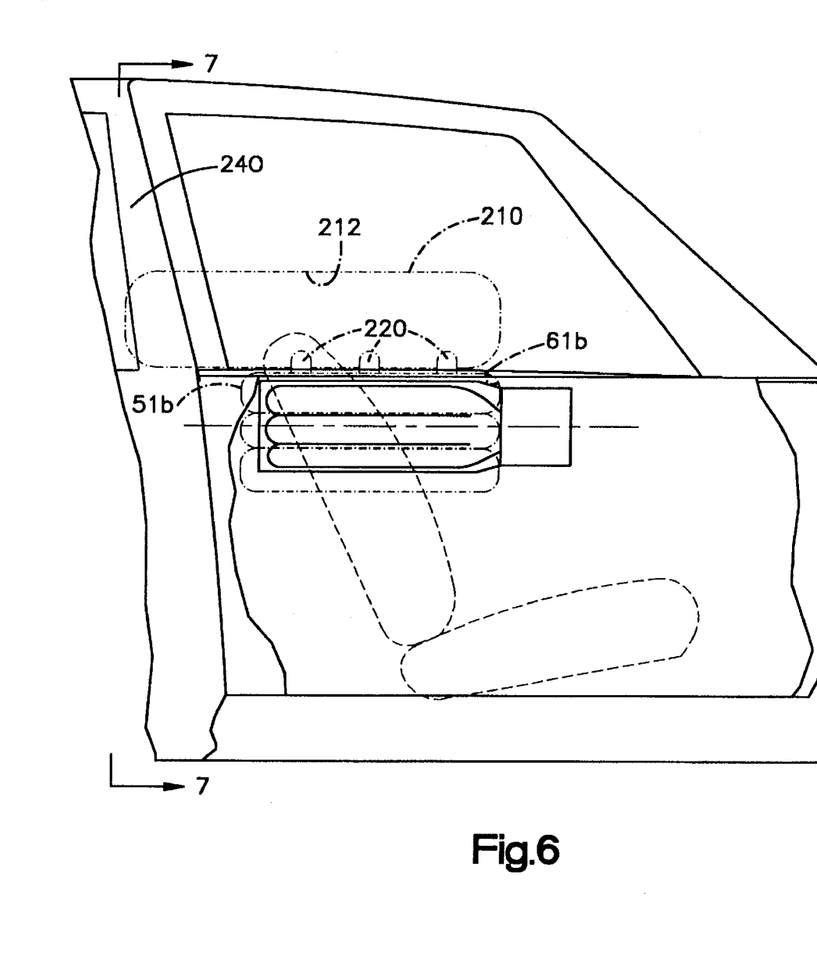
FIG. 6 is a view, similar to FIG. 1, showing a third embodiment of the present invention.
Figure 7:
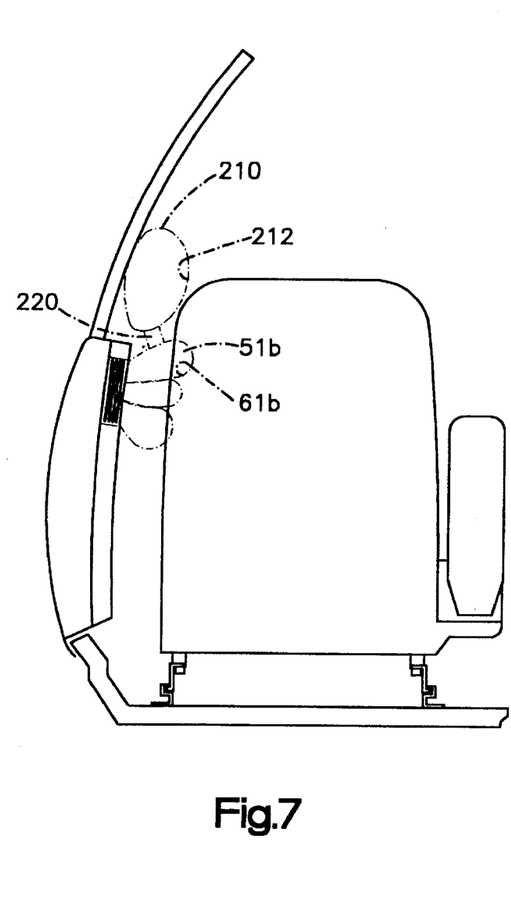
FIG. 7 is a view in the direction of line 7—7 of FIG. 6.

A third embodiment of the present invention is illustrated in FIGS. 6 and 7. Since the embodiment of the invention illustrated in FIGS. 6 and 7 is generally similar to the embodiment illustrated in FIGS. 1–4, similar numerals are utilized to designate similar components, the suffix letter "b" being associated with the numerals of the embodiment of FIGS. 6 and 7 to avoid confusion.

As shown in FIGS. 6 and 7, an air bag portion 210 is inflatable into position to restrain the head of the occupant. When inflated, the air bag portion 210 extends across a B-pillar 240 of the vehicle as shown in FIG. 6. The air bag portion 210 defines a chamber 212 which communicates through a plurality of passages 220 with the chamber 61b of the air bag portion 51b. Inflation fluid flows from the chamber 61b through the passages 220 into the chamber 212 when the air bag portion 51b is inflated and the torso of the occupant moves into the air bag portion 51b.

The flow area of the passages 220 controls the pressure in the chamber 61b. Also, a portion of the inflation fluid which flows into the chamber 212 may be inflation fluid vented from the chamber 61b. Suitable valves or blow-out patches (not shown) could be located in passages 220 which open at a predetermined pressure in the chamber 61b to then direct gas into the air bag portion 210 to inflate the air bag portion 210. Thus, the air bag portion 210 inflates into position to restrain the head of the occupant after the air bag portion 51b has been inflated. Typically, the air bag portion 210 is inflated about 10 to 20 milliseconds after the air bag 51b is inflated.

When inflated, the air bag portion 210 protects the head of the occupant from striking an object intruding into the path of movement of the head, including the door window ledge and the B pillar 240 of the vehicle. The inflated air bag portion 210 is located adjacent the head of the occupant to resist movement of the head of the occupant when the head of the occupant engages the inflated air bag portion 210.

During a side impact against a vehicle, the torso of an occupant may move laterally in the vehicle first and the head of the occupant may then rotate down toward the shoulder closest to the side of the vehicle which is impacted due to the torso movement. By having the air bag portion 210 inflate after the air bag portion 51b has been inflated, the head of the occupant is restrained by the air bag portion 210 during its delayed movement relative to the torso down toward the shoulder. Thus, the head of the occupant is optimally protected against injury.

Figure 8:
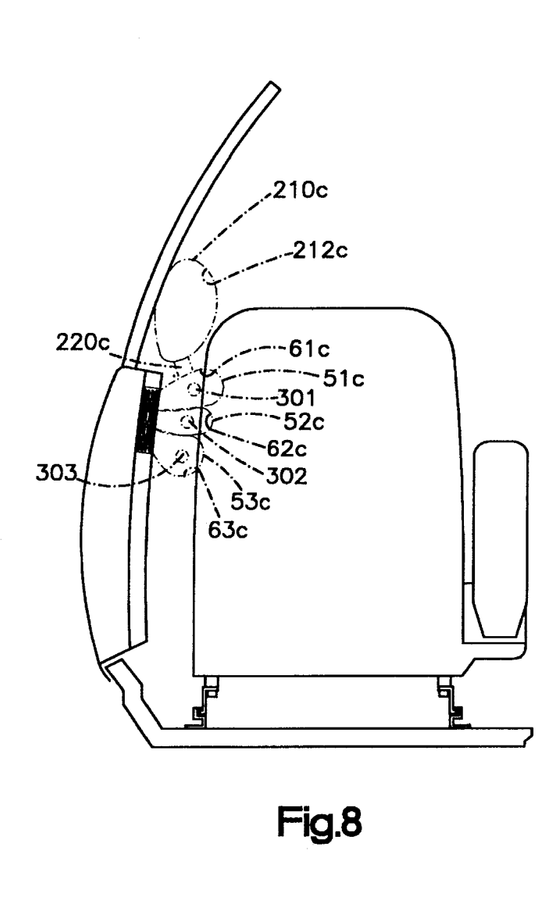
FIG. 8 is a view, similar to FIG. 7, showing a fourth embodiment of the present invention.

A fourth embodiment of the present invention is illustrated in FIG. 8. Since the embodiment of the invention illustrated in FIG. 8 is generally similar to the embodiment illustrated in FIGS. 6 and 7, similar numerals are utilized to designate similar components, the suffix letter "c" being associated with the numerals of the embodiment of FIG. 8 to avoid confusion.

As shown in FIG. 8, a vent valve 301 is associated with the air bag portion 51c. A vent valve 302 is associated with the air bag portion 52c. Similarly, a vent valve 303 is associated with the air bag portion 53c. The vent valve 301 opens when the pressure in the chamber 61c of the air bag portion 51c reaches a first predetermined pressure. The vent valve 302 opens when the pressure in the chamber 62c of the air bag portion 52c reaches a second predetermined pressure which is less than the first predetermined pressure. The vent valve 303 opens when the pressure in the chamber 63c of the air bag portion 53c reaches a third predetermined pressure which is less than the second predetermined pressure in chamber 62c.

When a vent valve opens, inflation fluid is released from the respective chamber to control the pressure in that chamber. Since the chamber 61c of the air bag portion 51c is vented at a pressure which is greater than the pressure at which the chamber 62c of the air bag portion 52c is vented and the pressure at which the chamber 63c of the air bag portion 53c is vented, the air bag chamber 61c has a greater pressure than the air bag chambers 62c, 63c and, thus, the air bag portion 51c can restrain the shoulder of the occupant with relatively high force. The air bag portions 52c, 53c can apply a relatively low force against the rib areas of the occupant they engage since the pressures in the chambers 62c, 63c are both lower than the pressure in the chamber 61c. Alternatively, different pressures can be provided in the air bag chambers 61c, 62c, 63c by providing each air bag portion with a vent of a different area.

Like the third embodiment shown in FIGS. 6 and 7 as already described hereinabove, inflation fluid in the embodiment of FIG. 8 is directed from the chamber 61c of the air bag portion 51c through the passages 220c to the chamber 212c of the air bag portion 210c after the air bag portion 51c has been inflated. The air bag portion 210c thereby protects the occupant's head due to head movement which occurs in a side impact against the vehicle after the torso moves.

Figure 9:
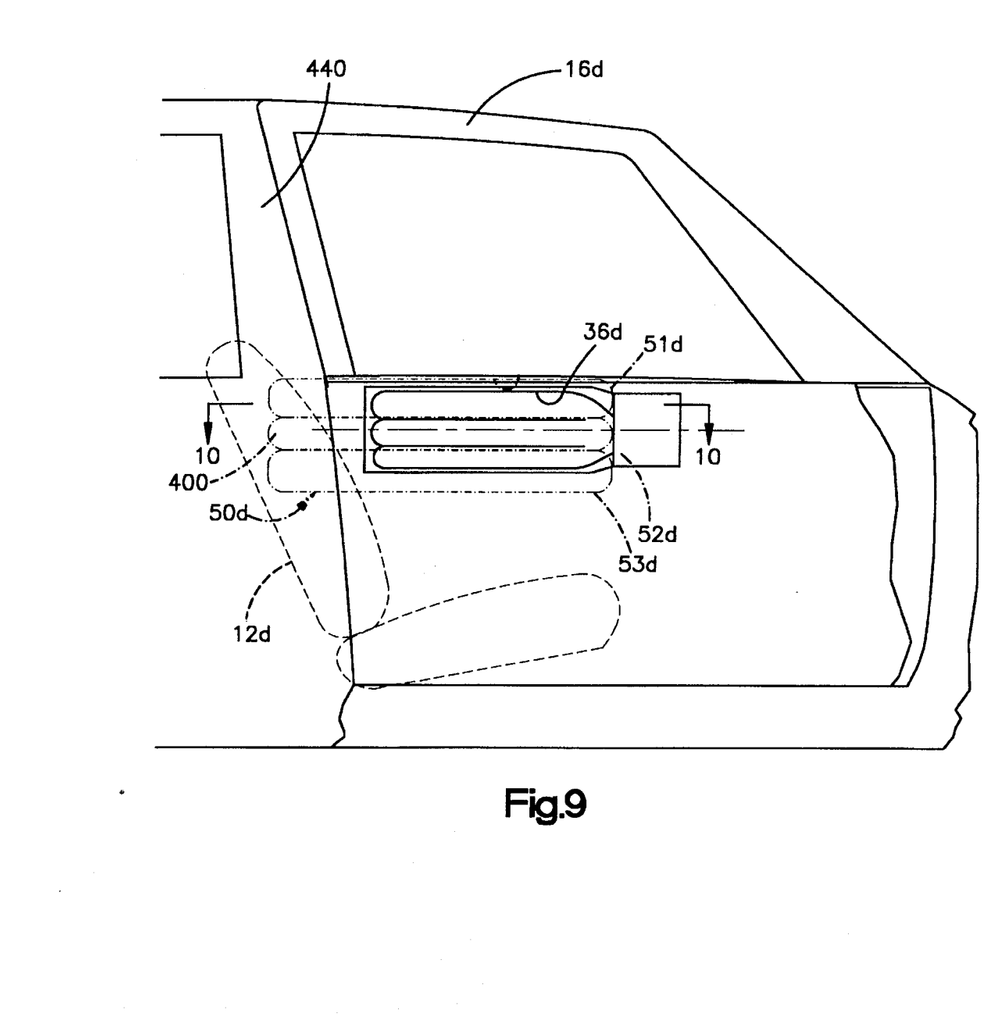
FIG. 9 is a view, similar to FIG. 1, showing a fifth embodiment of the present invention.
Figure 10:
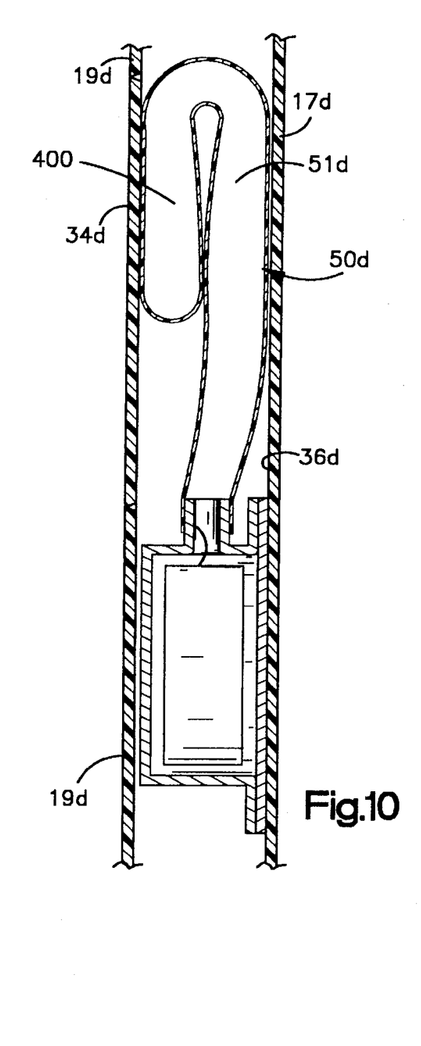
FIG. 10 is an enlarged schematic sectional view of a portion of FIG. 9, as viewed in the direction of line 10—10 of FIG. 9.

A fifth embodiment of the present invention is illustrated in FIGS. 9 and 10. Since the embodiment of the invention illustrated in FIGS. 9 and 10 is generally similar to the embodiment illustrated in FIGS. 1–4, similar numerals are utilized to designate similar components, the suffix letter "d" being associated with the numerals of the embodiment of FIGS. 9 and 10 to avoid confusion.

AS shown in FIGS. 9 and 10, each of the air bag portions 51d, 52d, 53d of the air bag 50d has an extra long length. The extra long length of the air bag portions 51d, 52d, 53d form an inflatable flap portion 400 which extends from the air bag portions 51d, 52d, 53d. When the air bag 50d is in its stored condition (illustrated in solid lines in FIGS. 9 and 10), the flap portion 400 is folded over in a manner as best shown in FIG. 10. The flap portion 400 is folded over so that the air bag 50d including the flap portion 400 can fit into the air bag compartment 36d in the vehicle door 16d.

When the air bag 50d is inflated (illustrated in dashed lines in FIG. 9), the flap portion 400 pivots from the compartment 36d and extends into the region adjoining the B-pillar area 440 (FIG. 9) of the vehicle. If the seat 12d is adjusted to a rearward position as shown in FIG. 9 and the flap portion 400 extends into the region adjoining the B-pillar area 440 upon a side impact against the vehicle, the occupant and the B-pillar area 440 are prevented from violently contacting each other.

Figure 11:
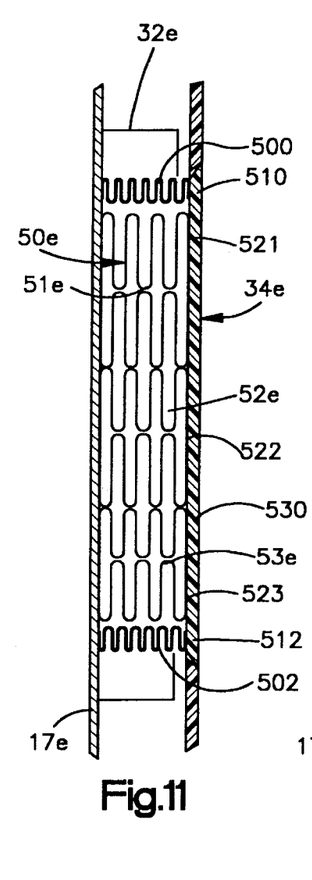
FIG. 11 is a schematic end view of an air bag assembly showing a sixth embodiment of the present invention.
Figure 12:
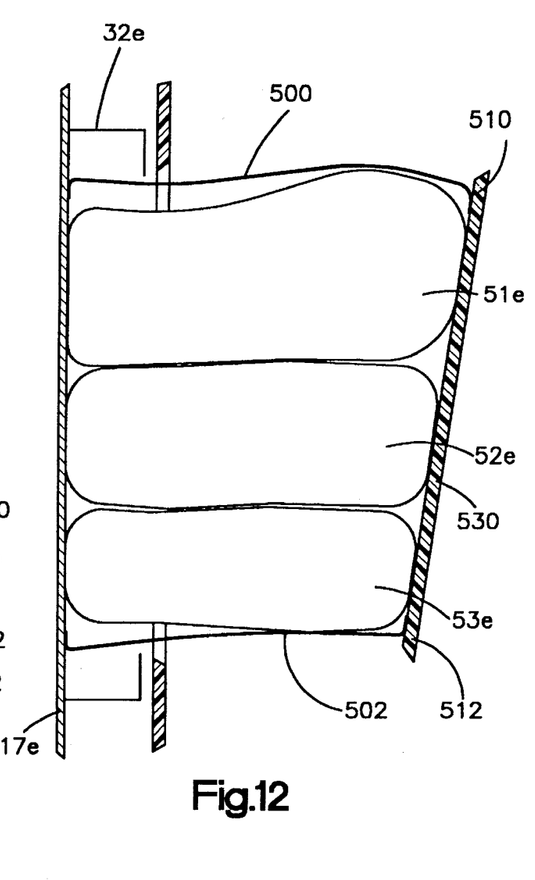
FIG. 12 is a view similar to FIG. 11 but showing parts in different positions.

A sixth embodiment of the present invention is illustrated in FIGS. 11 and 12. Since the embodiment of the invention illustrated in FIGS. 11 and 12 is generally similar to the embodiment illustrated in FIGS. 1–4, similar numerals are utilized to designate similar components, the suffix letter "e" being associated with the numerals of the embodiment of FIGS. 11 and 12 to avoid confusion.

As shown in FIG. 11, the air bag portions 51e, 52e, 53e may be connected at locations 521, 522, 523, respectively to the cover panel 34e using, for example, a suitable adhesive material or the like. The cover panel 34e may define the passenger compartment of the vehicle. A first folded tether strap 500 is connected between the inner door panel 17e and an upper end portion 510 of the cover panel 34e. A second folded tether strap 502 is connected between the inner door panel 17e and the cover panel 34e at a lower end portion 512 of the cover panel 34e.

When the air bag 50e is inflated from its stored condition shown in FIG. 11 to an inflated condition shown in FIG. 12, the air bag portions 51e, 52e, 53e expand into the vehicle occupant compartment to protect the occupant. Since the cover panel 34e is connected to the air bag portions 51e, 52e, 53e, the cover panel 34e also moves into the vehicle occupant compartment. The first and second tether straps 500, 502 unfold as the air bag portions 51*e*, 52*e*, 53*e* expand and the cover panel 34*e* moves into the vehicle occupant compartment. The first and second tether straps 500, 502 limit the travel of the air bag 50*e* and the cover panel 34*e* into the vehicle occupant compartment. Also, the first and second tether straps 500, 502 hold the cover panel 34*e* from moving away from the air bag portions 51*e*, 52*e*, 53*e* as the air bag portions 51*e*, 52*e*, 53*e* are expanding and the cover panel 34*e* is moving into the vehicle occupant compartment. The cover panel 34*e* acts as a pad to cushion and may spread the contact forces acting between the air bag portions 51*e*, 52*e*, 53*e* and the occupant. Also, since the inflator 32*e* provides inflation fluid flow in the rearward direction of travel of the vehicle, the portion of the pad 34*e* toward the front of the vehicle has a tendency to be pressurized faster than the portion of the pad 34*e* toward the rear of the vehicle. This difference in pressurization of the pad 34*e* would cause the force of deployment of the pad 34*e* acting against an out of position occupant, e.g. an occupant leaning forward and toward the vehicle door 16*e*, to be attenuated.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a vehicle having a passenger compartment and a vehicle front, rear, and side, said apparatus comprising:

vehicle occupant shoulder protection means located on the vehicle side and inflatable from a stored condition to an inflated condition between the vehicle side and the shoulder area of an occupant of the vehicle and for, when inflated, engaging the shoulder area of the occupant;

vehicle occupant upper rib protection means other than said shoulder protection means located on the vehicle side and inflatable from a stored condition to an inflated condition between the vehicle side and the upper rib area of the occupant and for, when inflated, engaging the upper rib area of the occupant;

sensor means for sensing a side impact against the vehicle;

means for directing inflation fluid into said vehicle occupant shoulder protection means and said vehicle occupant rib protection means when a side impact against the vehicle is sensed by said sensor means;

an actuatable inflator for, when actuated, releasing inflation fluid to be directed into said occupant shoulder protection means and said occupant upper rib protection means;

said occupant shoulder protection means including a first inflatable portion defining a first chamber into which inflation fluid from said inflator flows to inflate said first portion when a side impact against the vehicle occurs;

said occupant upper rib protection means including a second inflatable portion defining a second chamber into which inflation fluid from said inflator flows to inflate said second portion when a side impact against the vehicle occurs; and each of said first and second portions including vent valve means for releasing inflation fluid from the chamber of the respective portion to control the pressure in the chamber of the respective portion, said vent valve means of said first portion opening when the pressure in said first chamber reaches a first predetermined pressure, said vent valve means of said second portion opening when the pressure in said second chamber reaches a second predetermined pressure which is lower than said first predetermined pressure.

2. An apparatus according to claim 1 wherein (i) said occupant shoulder protection means has an innermost occupant contact point in the passenger compartment which lies in a first vertical plane extending in the forward and rearward directions of travel of the vehicle when said occupant shoulder protection means is inflated, and (ii) said occupant upper rib protection means has an innermost occupant contact point in the passenger compartment which lies in a second vertical plane extending in the forward and rearward directions of travel of the vehicle when said occupant upper rib protection means is inflated, said first and second vertical planes lying parallel with a central vertical plane which extends in the forward and rearward directions of travel of the vehicle and divides the vehicle in half in the forward and rearward directions of travel of the vehicle, said first vertical plane lying closer in distance to said central vertical plane than said second vertical plane.

3. An apparatus for use in a vehicle having a passenger compartment and a vehicle front, rear, and side, said apparatus comprising:

vehicle occupant shoulder protection means located on the vehicle side and inflatable from a stored condition to an inflated condition between the vehicle side and the shoulder area of an occupant of the vehicle and for, when inflated, engaging the shoulder area of the occupant;

vehicle occupant upper rib protection means other than said shoulder protection means located on the vehicle side and inflatable from a stored condition to an inflated condition between the vehicle side and the upper rib area of the occupant and for, when inflated, engaging the upper rib area of the occupant;

sensor means for sensing a side impact against the vehicle;

means for directing inflation fluid into said vehicle occupant shoulder protection means and said vehicle occupant rib protection means when a side impact against the vehicle is sensed by said sensor means;

an actuatable inflator for, when actuated, releasing inflation fluid to be directed into said occupant shoulder protection means and said occupant upper rib protection means;

said occupant shoulder protection means including a first inflatable portion defining a first chamber into which inflation fluid from said inflator flows to inflate said first portion when a side impact against the vehicle occurs;

said occupant upper rib protection means including a second inflatable portion defining a second chamber into which inflation fluid from said inflator flows to inflate said second portion when a side impact against the vehicle occurs;

said first portion of said occupant shoulder protection means being located adjacent the shoulder area of the occupant to protect the shoulder area of the occupant from the vehicle side when said first portion is inflated and the shoulder area of the occupant engages said first portion;

said second portion of said occupant upper rib protection means being located adjacent the upper rib area of the occupant to protect the rib area of the occupant from the vehicle side when said second portion is inflated and the upper rib area of the occupant engages said second portion; and vehicle occupant head restraint means located on the vehicle side and inflatable from a stored condition on the vehicle side to an inflated condition between the vehicle side and the head of the occupant and for, when inflated, engaging and restraining the head of the occupant, said occupant head restraint means including a third inflatable portion defining a third chamber into which inflation fluid from said first chamber of said first portion flows to inflate said third portion only after said first portion has been inflated and has engaged the shoulder area of the occupant, said third portion being located adjacent the head of the occupant to protect the head of the occupant from forcibly striking an object when said third portion is inflated.

4. An apparatus according to claim 3 further comprising pad means associated with said first and second portions for acting between said first and second portions and the occupant.

5. An apparatus according to claim 4 further comprising at least one tether strap interconnecting the vehicle side and said pad means and for limiting movement of said pad means and said first and second portions into the vehicle passenger compartment when said first and second portions are inflated.

6. An apparatus for use in a vehicle having a passenger compartment and a vehicle front, rear, and side, said apparatus comprising:

vehicle occupant protection means inflatable from a stored condition to an inflated condition between the vehicle side and the side of an occupant of the vehicle;

said vehicle occupant protection means including an inflatable first portion for, when inflated, engaging and protecting the torso of the occupant and an inflatable second portion for, when inflated, engaging and restraining the head of the occupant;

sensor means for sensing a side impact against the vehicle;

means for directing inflation fluid into said first portion to inflate said first portion when a side impact against the vehicle is sensed by said sensor means; and means for inflating said second portion into position to restrain the head of the occupant only after said first portion has been inflated and has engaged and protected the torso of the occupant.

7. An apparatus according to claim 6 further comprising an actuatable inflator for, when actuated, releasing inflation fluid to be directed into said first portion of said occupant protection means.

8. An apparatus according to claim 6 wherein each of said first and second portions of said occupant protection means, when inflated, is tubular in shape and has its longitudinal central axis extending along the forward and rearward directions of travel of the vehicle.

9. An apparatus according to claim 6 wherein said first portion defines a chamber and includes vent valve means for releasing inflation fluid from said chamber to control the pressure in said chamber, said vent valve means of said first portion opening when the pressure in said chamber reaches a predetermined pressure.

10. An apparatus according to claim 6 wherein said means for inflating said second portion includes at least one passage interconnecting said first and second portions and for, when opened, allowing inflation fluid to flow from said first portion to said second portion only after said first portion has been inflated and engaged by the torso of the occupant.

11. A method of protecting an occupant of a vehicle having a vehicle front, rear, and side during a side impact against the vehicle, said method comprising the steps of:

providing a source of inflation fluid;

inflating a vehicle occupant torso protection means from a stored condition to an inflated condition between the side of an occupant of the vehicle and the vehicle side in response to a side impact against the vehicle;

engaging the torso of the occupant by the inflated vehicle occupant torso protection means;

only after initially engaging the torso of the occupant by the inflated torso protection means, inflating a vehicle occupant head restraint means to an inflated condition between the head of the occupant and the vehicle side; and protecting the head of the occupant by the inflated vehicle occupant head restraint means by restraining sideward movement of the head of the occupant.

12. A method according to claim 11 wherein said vehicle occupant torso protection means comprises a shoulder area protection means and an upper rib area protection means and further including the steps of inflating said shoulder area protection means and said upper rib area protection means into the occupant compartment of the vehicle with said shoulder area protection means being inflated a greater distance into the occupant compartment than said upper rib area protection means.

13. A method of protecting an occupant of a vehicle having a vehicle front, rear, and side during a side impact against the vehicle, said method comprising the steps of:

providing a source of inflation fluid;

inflating a vehicle occupant protection means from a stored condition on the vehicle side to an inflated condition between the occupant of the vehicle and the vehicle side in response to a side impact against the vehicle;

applying a first force by said inflated occupant protection means to the shoulder area of the occupant to protect the shoulder area of the occupant when the shoulder area of the occupant engages said occupant protection means;

applying a second force lower than said first force by said inflated occupant protecting means to the upper rib area of the occupant to protect the upper rib area of the occupant when the rib area of the occupant engages said occupant protection means; and resisting movement of the head of the occupant relative to the torso of the occupant only after the shoulder area of the occupant and the rib area of the occupant have been engaged and protected by said inflated occupant protection means.

14. An apparatus for use in a vehicle having a passenger compartment and a vehicle door, said apparatus comprising:

vehicle occupant shoulder protection means located on the vehicle door and inflatable from a stored condition to an inflated condition between the vehicle door and the shoulder area of an occupant of the vehicle and for, when inflated, engaging the shoulder area of the occupant;

vehicle occupant upper rib protection means other than said shoulder protection means located on the vehicle door and inflatable from a stored condition to an inflated condition between the vehicle door and the upper rib area of the occupant and for, when inflated, engaging the upper rib area of the occupant;

sensor means for sensing a side impact against the vehicle;

means for directing inflation fluid into said vehicle occupant shoulder protection means and said vehicle occupant rib protection means when a side impact against the vehicle is sensed by said sensor means;

an actuatable inflator for, when actuated, releasing inflation fluid to be directed into said occupant shoulder protection means and said occupant upper rib protection means;

said occupant shoulder protection means including a first inflatable portion defining a first chamber into which inflation fluid from said inflator flows to inflate said first portion when a side impact against the vehicle occurs;

said occupant upper rib protection means including a second inflatable portion defining a second chamber into which inflation fluid from said inflator flows to inflate said second portion when a side impact against the vehicle occurs; and each of said first and second portions, when inflated, being tubular in shape and having a longitudinal central axis which extends along the vehicle door in the forward and rearward directions of travel of the vehicle, said first and second chambers communicating with each other at only one end of said inflated tubular first and second portions.

15. An apparatus according to claim 14 wherein said first and second portions define a neck region at which said first and second chambers converge and communicate with each other.

16. An apparatus for use in a vehicle having a passenger compartment and a vehicle front, rear, and side, said apparatus comprising:

vehicle occupant shoulder protection means located on the vehicle side and inflatable from a stored condition to an inflated condition between the vehicle side and the shoulder area of an occupant of the vehicle and for, when inflated, engaging the shoulder area of the occupant;

vehicle occupant upper rib protection means other than said shoulder protection means located on the vehicle side and inflatable from a stored condition to an inflated condition between the vehicle side and the upper rib area of the occupant and for, when inflated, engaging the upper rib area of the occupant;

sensor means for sensing a side impact against the vehicle;

means for directing inflation fluid into said vehicle occupant shoulder protection means and said vehicle occupant rib protection means when a side impact against the vehicle is sensed by said sensor means;

an actuatable inflator for, when actuated, releasing inflation fluid to be directed into said occupant shoulder protection means and said occupant upper rib protection means;

said occupant shoulder protection means including a first inflatable portion defining a first chamber into which inflation fluid from said inflator flows to inflate said first portion when a side impact against the vehicle occurs;

said occupant upper rib protection means including a second inflatable portion defining a second chamber into which inflation fluid from said inflator flows to inflate said second portion when a side impact against the vehicle occurs;

said first portion of said occupant shoulder protection means being located adjacent the shoulder area of the occupant to protect the shoulder area of the occupant from the vehicle side when said first portion is inflated and the shoulder area of the occupant engages said first portion;

said second portion of said occupant upper rib protection means being located adjacent the upper rib area of the occupant to protect the rib area of the occupant from the vehicle side when said second portion is inflated and the upper rib area of the occupant engages said second portion; and vehicle occupant head restraint means located on the vehicle side and inflatable from a stored condition on the vehicle side to an inflated condition between the vehicle side and the head of the occupant and for, when inflated, engaging the head of the occupant, said occupant head restraint means including a third inflatable portion defining a third chamber into which inflation fluid from said first chamber of said first portion flows to inflate said third portion after said first portion has been inflated, said third portion being located adjacent the head of the occupant to protect the head of the occupant from forcibly striking an object when said third portion is inflated;

wherein each of said first and second portions, when inflated, is tubular in shape and has its longitudinal central axis extending along the forward and rearward directions of travel of the vehicle.

* * * * *